(12) United States Patent
Isobe

(10) Patent No.: US 7,303,697 B2
(45) Date of Patent: Dec. 4, 2007

(54) PHOSPHOR AND PRODUCTION PROCESS FOR THE SAME

(75) Inventor: Tetsuhiko Isobe, Kanagawa (JP)

(73) Assignee: Keio University, Tokyo (JP)

( * ) Notice: Subject to any disclaimer, the term of this patent is extended or adjusted under 35 U.S.C. 154(b) by 218 days.

(21) Appl. No.: 11/038,112

(22) Filed: Jan. 21, 2005

(65) Prior Publication Data

US 2006/0011890 A1 Jan. 19, 2006

(30) Foreign Application Priority Data

Jul. 16, 2004 (JP) .............................. 2004/209821

(51) Int. Cl.
*C09K 11/59* (2006.01)
*C09K 11/66* (2006.01)

(52) U.S. Cl. ..................... 252/301.6 F; 252/301.4 F; 252/301.36; 428/403; 428/407; 977/811; 977/834

(58) Field of Classification Search ............... 428/407, 428/403; 252/301.4 F, 301.6 F, 301.4 R, 252/301.36
See application file for complete search history.

(56) References Cited

U.S. PATENT DOCUMENTS 5,985,173 A * 11/1999 Gray et al. ........... 252/301.4 R
7,041,371 B2 * 5/2006 Ogura et al. ................ 428/403

OTHER PUBLICATIONS

Miki et al, "Low-Temperature Synthesis of Nanosize Zn2SiO4:Mn2+ Phosphor from the Precursor Sol in Supercritical Ethanol and its Photoluminescent Properties",Journ. Sol-Gel Sci Tech., #31, pp. 73-77, Aug. 2004.*
Ahmadi, et al. Materials Research Bulletin 35 (2000) 1869-1879, "Low-temperature synthesis of pure and Mn-doped willemite phosphor ($Zn_2SiO_4$ :Mn) in aqueous medium", institute of Physical Chemistry, University of Hamburg, Bundesstrasse 45, D-20146 Hamburg, Germany.
Cannas, et al. J. Mater. Chem., 1999, 9, 1765-1769, "XRD, TEM and $^{29}$ Si MAS NMR study of sol-gel $ZnO$-$SiO_2$ nanocomposites", Dipartimento di Scienze Chimiche, Universita di Cagliari, Via Ospedale 72, I-0124 Cagliar, Italy.

(Continued)

*Primary Examiner*—C. Melissa Koslow
(74) *Attorney, Agent, or Firm*—Oblon, Spivak, McClelland, Maier & Neustadt, P.C.

(57) ABSTRACT

The object of the present invention is to provide a phosphor which is excellent in transparency, light transmittance, luminescence efficiency and luminescent intensity and at the same time, processes for producing the phosphor. Preferred embodiments of the invention include a phosphor characterized in that phosphor particles represented by the general formula $[(L)_a(M)_b(N)_cO_d:Y]$ are covered with an organic compound bearing at least one functional group at a terminal or side chain, wherein L is a metallic element such as Zn; M is a metallic element such as Al; N is Si or Ge; O is oxygen; Y is at least one activating agent such as $Mn^{2+}$, $Eu^{2+}$, $Cu^{2+}$ or $Yb^{2+}$; and a, b, c and d are each a value satisfying the relationships $0 < a \leq 2$, $0 \leq b \leq 2$, $0 \leq c \leq 2$ and $2a+3b+4c=2d$.

13 Claims, 4 Drawing Sheets

OTHER PUBLICATIONS

Figure 1A:
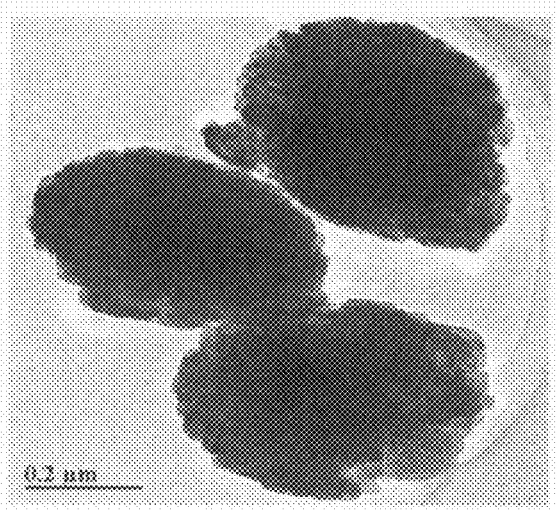

Miki, et al. "Low-temperature synthesis and optical properties of $(Zn_2SiO_4:Mn^{24})$ phosphor in a supercritical ethanol solvent" (Kelo Univ.) OT Miki, T. Isobe, Luminescent Ir (III) complexes-Electrochemical and Photochemical behaviors-(Nara University of Education, Osaka University) Takeko Matsumura-Inove, O Yuko Yamamoto, Naokazu Yoshikawa, Yasuchika Hasegawa, and Shozo Yanakida, Phosphor Research Society, The 292nd meeting technical digest, Apr. 3, 2002.

* cited by examiner

FIG. 3A
ST
FIG. 3B
ST
FIG. 4
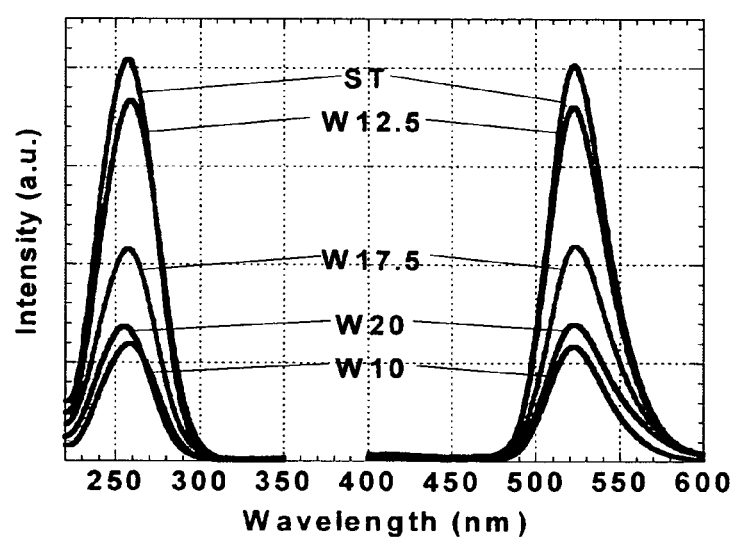

PHOSPHOR AND PRODUCTION PROCESS FOR THE SAME

TECHNICAL FIELD

The present invention relates to a phosphor and a process for producing the same. More particularly, it pertains to so-called nano-phosphor which is excellent in transparency and light transmittance and has high luminescence efficiency, and to a process for producing the same.

BACKGROUND ARTS

In recent years, attention has been paid to that a nano-structural crystal exhibits peculiar optical-characteristics in a semiconductor including ultrafine particles and porous silicon that are typified by silicon (Si) and germanium (Ge). By the term nanostructural crystal as mentioned herein is meant crystalline particles having a particle diameter of several nm, approximately. Thus a phosphor having a nanostructural crystal is generally designated as nanocrystal phosphor or nano-phosphor.

The phosphor is employed for vacuum ultraviolet excitation luminescent element such as plasma display panel (PDP), and for instance, practical application is performed by using $Zn_2SiO_4:Mn^{2+}$ as a green phosphor, $Ba\,Mg\,Al_{10}O_{17}:Eu^{2+}$ as a blue phosphor and $(Y, Gd)BO_3:Eu^{2+}$ as a red phosphor.

In recent years, a trend towards high precision, fineness and luminance has steadily been advanced in an image display unit which displays color images such as PDP using cathode-ray-tube and field emission display (FED) which is expected as next-generation thin display, whereby higher luminescence efficiency is required of a phosphor. In order to respond thereto, there have been developed phosphors having better characteristics. However, a phosphor with sufficiently satisfactory characteristics has not yet been obtained.

Moreover in recent years, a demand for a nanosized phosphor is rapidly increased. The reason for this is that consideration is given to the applications of a nano-phosphor having high transparency and light transmittance in the fields of information security, medical machinery and equipment, building, interior and the like other than an image display unit such as PDP and FED.

Importance should be attached to the improvement of a green phosphor, since it occupies 70% of luminance on a white screen. As a typical example of materials for green phosphors, a $Zn_2SiO_4:Mn^{2+}$ based phosphor is cited.

As processes for producing $Zn_2SiO_4:Mn^{2+}$ based phosphor, there are known (1) solid phase process, (2) sol-gel process, (3) hydrothermal synthetic process, (4) synthetic process using supercritical water and (5) synthetic process using supercritical ethanol.

(1) In the case of solid phase process, crystalline $Zn_2SiO_4:Mn^{2+}$ is synthesized by firing a mixture of an oxide and/or a carbonate at a high temperature of around 1000° C., wherein $Zn_2SiO_4$ is formed at 900° C., and at 1000° C. or higher, almost single phase $Zn_2SiO_4$ is obtained, but depending upon the handling before and after the firing, there are caused such problems as deterioration in luminescence characteristics, lattice strain and lattice defect. Further there is raised a problem of ZnO sublimation making it impossible to maintain a stoichiometric ratio according to the charged chemical composition. In addition, it is impossible for the solid phase process to nanosize a phosphor, since the particle diameter of fired particles is much larger than that in a liquid phase process and further, large particles are agglomerated by firing at a high temperature. When the fired particles are pulverized by means of a ball mill or the like, there is also created a problem of deterioration in luminescent intensity due to lowered crystallinity.

(2) In the case of sol-gel process (refer to C. Cannas, M. Casu, A. Lai, G. Piccaluga, "XRD, TEM and $^{29}Si$ MAS NMR study of Sol-Gel ZnO—$SiO_2$ nanocomposites" J. Mater. Chem. 9, 1765-1769 (1999), it is difficult for the process to synthesize without growing nanoparticles, since firing at 800° C. or higher is necessary.

The above-mentioned problems due to synthesis at a high temperature are common to a variety of composite oxides typified by $Zn_2SiO_4$. In order to solve such problems, investigations have recently been made on (3) a hydrothermal synthesis process by the use of an autoclave [refer to T. S. Ahmadi, M. Haase, H. Weller, "Low temperature synthesis of pure and Mn-doped willemite phosphor ($Zn_2SiO_4:Mn$) in aqueous medium", Material Research Bulltin, 35, 11 1869-1879 (2000)]. According to the hydrothermal synthesis process, it is possible to obtain $Zn_2SiO_4:Mn$ having high crystallinity is obtainable by repeating dissolution and deposition at around 250° C. under high pressure without requiring a firing step. Nevertheless, it is impossible for the process in question to obtain a product having a uniform particle size.

(4) A proposal has been made on a synthesis process using supercritical water, which however, is problematic in that the process cannot be conducted with an ordinary autoclave because of severe working conditions over critical point of water (critical temperature of 374.1° C., critical pressure of 22.04 MPa).

Under such circumstances it has been found by the present inventors that nano-phosphor $Zn_2SiO_4:Mn^{2+}$ can be synthesized by the use of (5) nitric acid and supercritical ethanol (critical temperature of 243.0° C., critical pressure of 6.14 MPa), and the above-mentioned finding was already published [refer to the published data on "Low temperature synthesis and optical properties of $Zn_2SiO_4:Mn^{2+}$ phosphor in a supercritical ethanol solvent" by Takuro Miki, Tetsuhiko Isobe in the 69th Congress of Japan Electrochemistry Association, April, 2002].

However the above-mentioned process involves the problem in that since the nitric acid acts as an oxidizing agent and carbonizes the ethanol, allowing the resultant carbon to remain in the matrix of the phosphor, it is colored brown and thus the luminescent intensity is deteriorated. Moreover, when further miniaturization of color dot is required as a display material, it is impossible to cope therewith by the foregoing process using nitric acid along with ethanol.

Such being the case, it is required to assure a nano-phosphor having higher luminescence efficiency and at the same time, establish a process for producing a nano-phosphor having higher luminescence efficiency which process is capable of controlling the configuration of the substance.

DISCLOSURE OF THE INVENTION

It is an object of the present invention in the light of the foregoing present situation to provide a nano-phosphor which has high luminescence efficiency and which is typified by $Zn_2SiO_4:Mn^{2+}$ based phosphor and at the same time, provide a process for producing the above-mentioned nano-phosphor.

As the result of intensive extensive research and investigation on nano-phosphor accumulated by the present inventors, it has been discovered that (i) a more minuscule nano-phosphor is obtainable with further enhanced luminescence efficiency by modifying the surface of a nano-phosphor to suppress the aggregation and a morphization thereof and that (ii) a phosphor having high luminescent intensity is obtainable by using a carboxylate or the like. The present invention has been accomplished by the foregoing findings and information.

That is to say, the present invention provides the following phosphor 1 and 2 and a process for producing the phosphor 3 and 4.

1. A phosphor comprising phosphor particles that are covered with an organic compound bearing at least one functional group at a terminal or side chain, said particles being represented by the general formula $[(L)_a(M)_b(N)_cO_d:Y]$ wherein L is at least one metallic element selected from the group consisting of Zn, Mg, Ca, Sr and Ba; M is at least one metallic element selected from the group consisting of B, Al and Ga; N is Si or Ge; O is oxygen; Y is an at least one activating agent selected from the group consisting of $Mn^{2+}$, $Eu^{2+}$, $Cu^{2+}$, $Yb^{2+}$, $Cr^{3+}$, $Ce^{3+}$, $Pr^{3+}$, $Nd^{3+}$, $Sm^{3+}$, $Eu^{3+}$, $Tb^{3+}$, $Dy^{3+}$, $Er^{3+}$, $Tm^{3+}$ and $Mn^{4+}$; and a, b, c and d are each a value satisfying the relationships $0<a \leq 2$, $0 \leq b \leq 2$, $0 \leq c \leq 2$ and $2a+3b+4c=2d$.

2. The phosphor as set forth in the preceding item 1, wherein said particles are represented by the general formula $[Zn_a(M)_b(N)_cO_d:Y']$ in which M, N and O are as previously defined; Y' is at least one activating agent selected from the group consisting of $Mn^{2+}$, $Eu^{2+}$, $Cu^{2+}$, $Yb^{2+}$; and a, b, c and d are each a value satisfying the relationships $0<a \leq 2$, $0 \leq b \leq 2$, $0 \leq c \leq 2$ and $0<d \leq 4$.

3. First process for producing a surface-modified phosphor of the invention: A process for producing the phosphor as set forth in the preceding item 1 which comprises reacting (a) a carboxylate of zinc, (b) a compound containing at least one metallic element selected from the group consisting of B, Al and Ga, (c) a compound containing at least one metallic element selected from the group consisting of Si and Ge, and (e) a compound containing at least one metallic element selected from the group consisting of Mn, Eu, Cu and Yb under the conditions of hydrolysis/polycondensation in a mixed solvent composed of water and a polar organic solvent to prepare a precursor sol and subsequently maturing or reacting the resultant precursor sol in the presence of (f) an organic compound bearing at least one functional group at a terminal or side chain, a polar organic solvent in a supercritical state and water.

4. Second process for producing surface-nonmodified phosphor of the invention: A process for producing a phosphor which comprises reacting (a) a carboxylate of zinc, (b) a compound containing at least one metallic element selected from the group consisting of B, Al and Ga, (c) a compound containing at least one metallic element selected from the group consisting of Si and Ge, and (e) a compound containing at least one metallic element selected from the group consisting of Mn, Eu, Cu and Yb under the conditions of hydrolysis/polycondensation to prepare a precursor sol and subsequently maturing or reacting the resultant precursor sol in the presence of a polar organic solvent in a supercritical state and water, said phosphor being represented by the general formula $[Zn_a(M)_b(N)_cO_d:Y']$ wherein M is at least one metallic element selected from the group consisting of B, Al and Ga; N is Si or Ge; O is oxygen; Y is an at least one activating agent selected from the group consisting of $Mn^{2+}$, $Eu^{2+}$, $Cu^{2+}$ and $Yb^{2+}$; and a, b, c and d are each a value satisfying the relationships $0<a \leq 2$, $0 \leq b \leq 2$, $0 \leq c \leq 2$ and $0<d \leq 4$.

The phosphor according to the present invention, in which uniform ultrafine particles are specifically surface-modified, is imparted with extremely high luminescence efficiency. Accordingly it is effectively utilized as a material for forming phosphor films/membranes having high transparency and light transmittance in the fields of an image display unit such as PDP, information security, medical machinery and equipment, building, interior and the like.

According to the first process of the present invention, on producing a nano-phosphor, a specific organocompound such as polyethylene glycol as a surface-modifying agent is added in a precursor sol, whereby spherical particles can be produced by suppressing anisotropic growth of crystals. When nanosized particles become further small, the luminescence efficiency is usually lowered. However a phosphor, when surface-modified, passivates the surface of itself, and in spite of ultrafine nano-phosphor, the luminescence efficiency can greatly be enhanced.

According to the second process of the present invention, a precursor sol is prepared from a carboxylate of zinc as a starting material, and is matured or reacted in the presence of water and a polar organic solvent in a supercritical state, thereby enabling to produce a phosphor greatly enhanced in luminescence intensity without causing carbonization of the polar organic solvent due to an oxidizing agent, contamination thereof or lowering the luminescence intensity.

Further according to the first and second processes of the present invention, it is made possible to produce a particulate phosphor wherein primary particles have an average particle diameter in the range of 0.5 to 50 nm.

BRIEF DESCRIPTON OF THE DRAWINGS

Figure 1B:
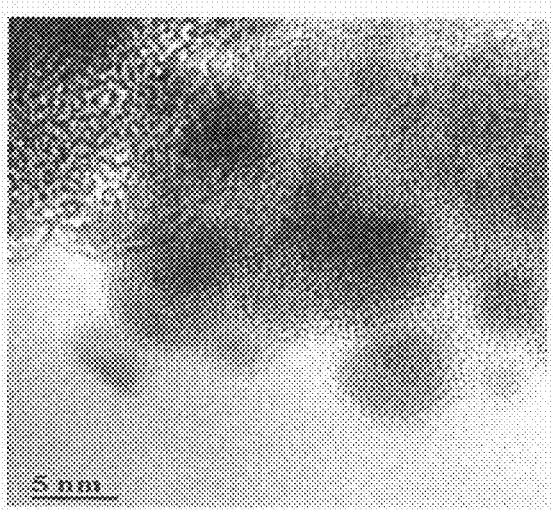
Figure 2:
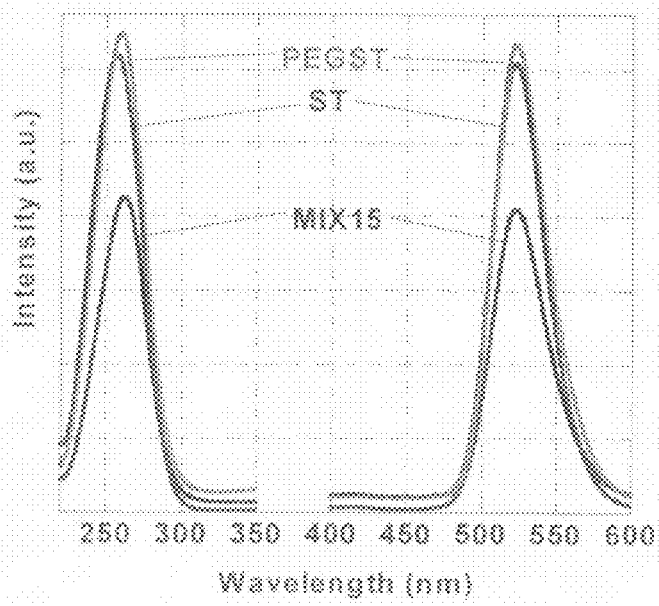
Figure 5A:
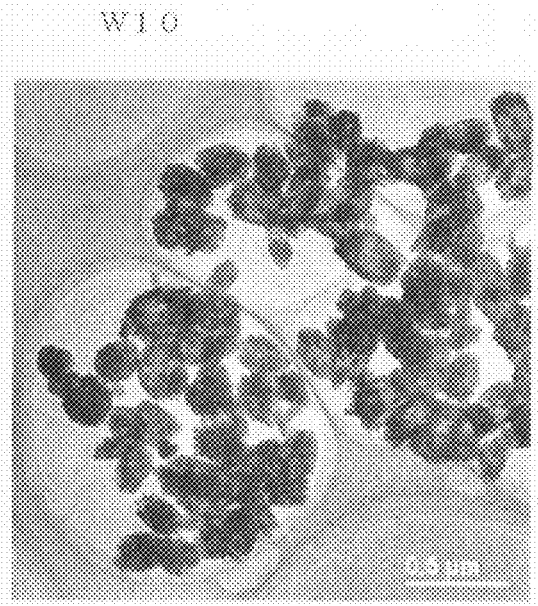
Figure 5B:
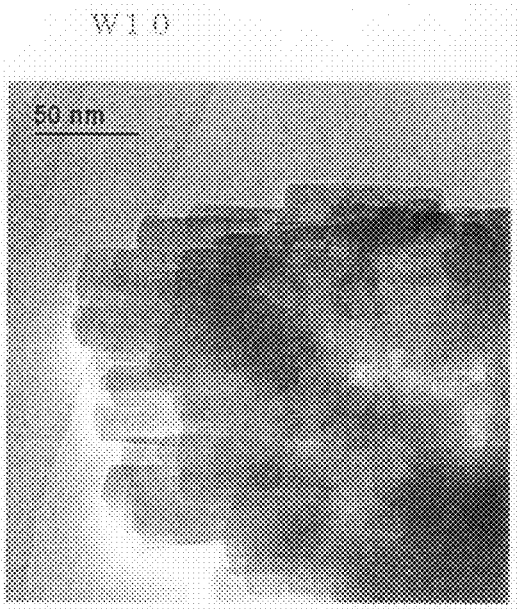
Figure 6A:
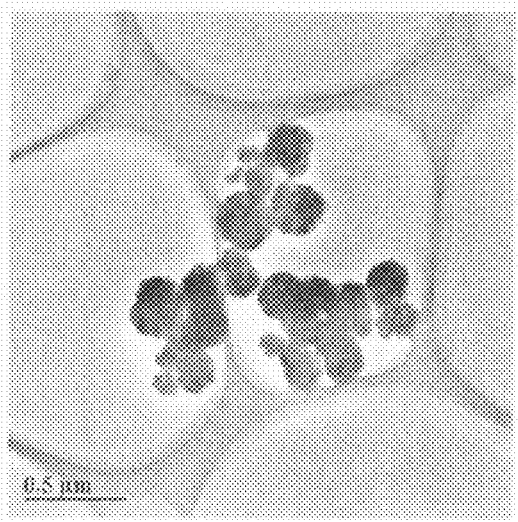
Figure 6B:
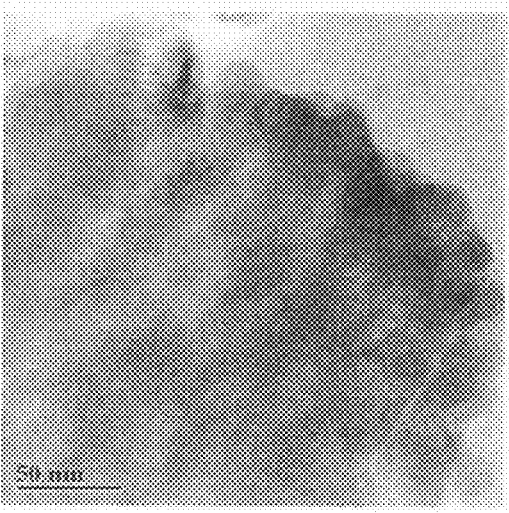
Figure 7:
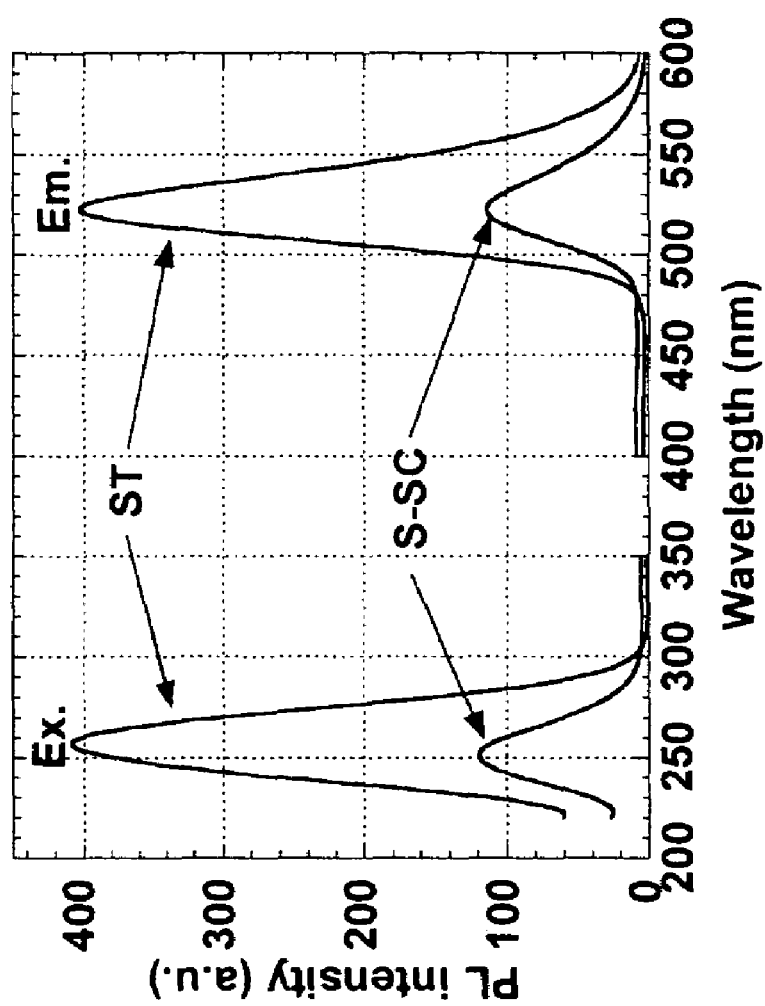

FIG. 1 is a TEM micrograph illustrating the state of the particles of the phosphor (PEGST) obtained in Example 1. It is understood therefrom that primary particles of single nanometer-size are present in the PEG 4000 matrix, and aggregated in the form of multi-core;

FIG. 2 shows excitation/fluorescence spectra of the phosphor (PEGST, ST, MIX 15) obtained in Examples, wherein PEGST, in spite of the amount of $Zn_2 SiO_4:Mn^{2+}$ therein being decreased corresponding to PEG, exhibits a highest luminescence intensity among three samples, PEGST is not so much anisotropically grown as ST is, but shows luminescence intensity somewhat higher than that of ST, and the luminescence intensities of PEGST and ST are almost 1.5 times that of MIX 15;

FIG. 3 is a TEM micrograph illustrating the state of the particles of the phosphor (ST) obtained in Example 3, wherein rod-shaped primary particles were observed;

FIG. 4 shows fluorescence spectra of the samples that were synthesized by varying the water/ethanol ratio in the sol, wherein the sample having a numerical value of X next to the letter "W" means that it was obtained at a water/ethanol ratio=X/(30−X), while among the samples that were synthesized by varying the water/ethanol ratio in the sol, the ST phosphor synthesized at X=15, namely water/ethanol ratio=1/1 showed a highest luminescence intensity;

FIG. 5 is a TEM micrograph illustrating the state of the particles of the phosphor (W10) obtained in Example 5, wherein rod-shaped primary particles were observed;

FIG. 6 is a TEM micrograph illustrating the state of the particles of the phosphor (W20) obtained in Example 6, wherein spherical primary particles were observed; and FIG. 7 shows excitation/fluorescence spectra of the phosphor (ST) obtained in Example 3 without adding nitric acid, and the phosphor (S—SC) obtained in Comparative Example 1 by adding nitric acid. It is understood therefrom that the phosphor (ST) has luminescence intensity about four times that of the phosphor (S—SC), which is attributable to the use and nonuse of nitric acid.

THE MOST PREFERRED EMBODIMENTS TO CARRY OUT THE INVENTION

The phosphor according to the present invention is characterized in that phosphor particles represented by the general formula $[(L)_a(M)_b(N)_cO_d:Y]$ are covered with an organic compound bearing at least one functional group at a terminal or side chain.

In the foregoing general formula, a metal oxide which is the matrix of the phosphor is represented by the general formula $[(L)_a(M)_b(N)_cO\ d]$ wherein L is at least one metallic element selected from the group consisting of zinc (Zn), magnesium (Mg), calcium (Ca), strontium (Sr) and barium (Ba); M is at least one metallic element selected from the group consisting of boron (B), aluminum (Al) and gallium (Ga); N is silicon (Si) or germanium (Ge); of these, L is preferably any of Zn, Ca, Sr and Ba, M is preferably any of B and Al, N is preferably Si, and a, b, c and d are each a value satisfying the relationships $0<a\leq2$, $0\leq b\leq2$, $0\leq c\leq2$ and $2a+3b+4c=2d$.

In the foregoing general formula, Y is at least one activating agent selected from the group consisting of manganese ions ($Mn^{2+}$, $Mn4^+$), europium ions ($Eu^{2+}$, $Eu3^+$), copper ions ($Cu^{2+}$), ytterbium ions ($Yb^{2+}$), chromium ions ($Cr^{3+}$), cerium ions ($Ce^{3+}$), praseodymium ions ($Pr^{3+}$), neodymium ions ($Nd^{3+}$), samarium ions ($Sm^{3+}$), terbium ions ($Tb^{3+}$), dysprosium ions ($Dy^{3+}$), erbium ions ($Er^{3+}$) and thulium ions ($Tm^{3+}$). Of these, $Mn^{2+}$, $Eu^{2+}$, $Cu^{2+}$ and $Yb^{2+}$ are particularly preferable.

More specifically, the phosphor according to the present invention preferably comprises phosphor particles that are represented by the general formula $[Zn_a(M)_b(N)_cO_d:Y']$, and are covered with an organic compound bearing at least one functional group at a terminal or side chain.

In the general formula, M, N and O are as previously defined; Y' is at least one activating agent selected from the group consisting of $Mn^{2+}$, $Eu^{2+}$, $Cu^{2+}$ and $Yb^{2+}$; and a, b, c and d are each a value satisfying the relationships $0<a\leq2$, $0\leq b\leq2$, $0\leq c\leq2$ and $0<d\leq4$.

Specific examples of the metal oxides as the matrix include $Zn_2SiO_4$, $Zn_2GeO_4$, $ZnB_2O_4$, $ZnGa_2O_4$ and $ZnAl_2O_4$. Of these, $Zn_2SiO_4$ is particularly preferable. As the activating agent Y', manganese ion ($Mn^{2+}$) is particularly preferable.

The organic compound bearing at least one functional group at a terminal or side chain (hereinafter sometimes referred to as "modifying agent") covers the surface of the phosphor particles, and is bonded thereto by chemical adsorption. By covering the surface of the phosphor particles with the modifying agent, it is made possible to suppress the aggregation of the particles themselves and as a result, to enhance the luminescence efficiency of the phosphor.

Examples of the functional group in the modifying agent include group 15 or 16 elements in the Periodical Table and a functional group bearing at least one hydrogen atom. The group 15 element is preferably nitrogen or phosphorus. The group 16 element is preferably oxygen or sulfur. More specific examples of the functional groups include hydroxyl group (OH group), COOH group, SH group, $SO_3H$ group, NH group, $NH_2$ group, NHR (R stands for an alkyl group having 1 to 4 carbon atoms), $HPO_4$ group and $H_2PO_4$ group. Of these, hydroxyl group (OH group) is particularly preferable.

More specific examples of the modifying agent include isobutyl alcohol; 1,4-butanediol; 1,5-pentanediol; 1,6-hexanediol; glycerol; ethylene glycol; trimethylene glycol; 1,3-propanediol; 1,4-hydroxybenzene; 1,3-hydroxybenzene; 1,2-hydroxybenzene; 2-hydroxyethyl mercaptan, 2-hydroxyethylamine and a low molecular weight polymer.

The above-mentioned low molecular weight polymer is not specifically limited provided that it is soluble in water, but is exemplified by polyethylene glycol (hereinafter sometimes referred to as "PEG") having a weight-average molecular weight (Mw) of 150 to 20,000, polyvinyl alcohol and polyvinyl ether.

Of these, are preferable 1,4-butanediol, glycerol, ethylene glycol, PEG having a weight-average molecular weight (Mw) of 200 to 15,000 particularly of 300 to 10,000, polyvinyl alcohol and polyvinyl ether.

The above-exemplified organic compound as the modifying agent may be used alone or in combination with at least one other species.

In the following, detailed description will be given of production processes of the surface-modified phosphor according to the present invention.

The phosphor according to the present invention represented by the general formula $[(L)_a(M)_b(N)_cO_d:Y]$ can be efficiently produced by reacting a compound containing the foregoing metallic element L, M, N or Y as a starting material in a mixed solvent composed of water and a polar organic solvent under the reaction conditions of hydrolysis/polycondensation to prepare a precursor sol, and maturing or reacting the resultant precursor sol in the presence of an organic compound bearing at least one functional group at a terminal or side chain, a polar organic solvent in a supercritical state and water.

The compound containing the metallic element L, M, N or Y is not specifically limited, but is exemplified by at least one compound selected from the group consisting of a carboxylate, oxalate, nitrate, sulfate, phosphate, pyrophosphate, borate, silicate, aluminate, tartrate, benzoate, oleate, perchlorate, citrate, salicylate, hydroxide, thiocyanate, lactate, acetylacetonato salts, alkoxide and halogenide.

Of these, the compound containing the metallic element L is preferably a carboxylate bearing an alkyl group with 1 to 20 carbon atoms such as acetate, the compound containing the metallic element M and N is preferably an alkoxide bearing an alkyl group with 1 to 20 carbon atoms such as ethoxide, and the compound containing Y is preferably a carboxylate bearing an alkyl group with 1 to 20 carbon atoms such as acetate.

The molar ratio of the compound containing the metallic element Y to the compound containing the metallic element L(Y/L ratio) when supplied as starting materials is usually in the range of 0.001 to 0.20. The hydrolysis/polycondensation reaction conditions of the compound containing the metallic element L, M, N or Y can be determined by a conventional method according to the types the compounds in question. In addition, an acid or alkali may be added to the reaction system as a catalyst to the extent that the working effects of the present invention is not impaired thereby.

The volumetric ratio of water/organic polar solvent is usually in the range 0.01 to 10, preferably 0.1 to 5. The sol concentration (volumetric ratio of sol/organic polar solvent) is preferably in the range of 0.01 to 10.

Preferably, the phosphor represented by the general formula $[Zn_a(M)_b(N)_cO_d:Y']$ according to the present invention is produced by the first production process according thereto. Specifically the objective phosphor can be effectively produced by reacting, as starting compounds, (a) zinc carboxylate, (b) a compound containing at least one metallic element selected from the group consisting of B, Al and Ga, (c) a compound containing at least one metallic element selected from the group consisting of Si and Ge, and (e) a compound containing at least one metallic element selected from the group consisting of Mn, Eu, Cu and Yb in a mixed solvent composed of water and a polar organic solvent under the reaction conditions of hydrolysis/polycondensation to prepare a precursor sol, and maturing or reacting the resultant precursor sol in the presence of (f) an organic compound bearing at least one functional group at a terminal or side chain, a polar organic solvent in a supercritical state and water.

While it is possible as mentioned above to produce the objective phosphor by mixing the components (a) to (c) and (e) in a mixed solvent composed of water and a polar organic solvent, reacting the components under the reaction conditions of hydrolysis/polycondensation to prepare a precursor sol, and maturing or reacting the resultant precursor sol in the presence of the component (f), a polar organic solvent in a supercritical state and water, the phosphor can be produced as well by simultaneously charging the components (a) to (c), (e) and (f), and maturing or reacting the resultant mixture in the coexistence thereof.

The first production process according to the present invention makes it possible to produce the nanostructured crystalline metallic oxide wherein ions of metallic element Y' such as $Mn^{2+}$ and $Eu^{2+}$ are doped by means of coprecipitation. By using the liquid phase reaction utilizing such coprecipitation, it is also made possible to efficiently produce the phosphor in which the activating agent is doped in a uniformly dispersed state, and primary particles have an average particle diameter of 0.5 to 50 nm, preferably 0.8 to 10 nm, and which is covered with the modifying agent.

Examples of zinc compounds (a) that are usable in the first production process according to the present invention include a carboxylate, oxalate, sulfate, phosphate, pyrophosphate, borate, silicate, aluminate, tartrate, benzoate, oleate, perchlorate, citrate, salicylate, hydroxide, thiocyanate, lactate, acetylacetonato salts, alkoxide and halogenide. Of these, in view of prevention of coloring and less corrosion of a reaction vessel and the like, a carboxylate is particularly preferable. The use of a carboxylate as a zinc compound prevents a polar organic solvent to be used as a solvent from being carbonized by oxidation, and precludes deterioration of the luminescence efficiency due to carbonized products remaining in the matrix of the phosphor.

Examples of carboxylates include those bearing an alkyl group having 1 to 20 carbon atoms such as formate, acetate, caprate, laurate, myristate, palmitate and stearate. Of these, zinc acetate is particularly preferable.

Examples of the compounds containing at least one metallic element selected from the group consisting of B, Al and Ga (b) include an alkoxide, carboxylate, oxalate, nitrate, sulfate, phosphate, pyrophosphate, borate, silicate, aluminate, tartrate, benzoate, oleate, perchlorate, citrate, salicylate, hydroxide, thiocyanate, lactate, acetylacetonato salts and halogenide. Of these, the alkoxide wherein metallic ions are attached to an alcohol group bearing an alkyl group having 1 to 20 carbon atoms is preferable, and methoxide and ethoxide are particularly preferable.

Compounds containing at least one metallic element selected from the group consisting of Si and Ge (c) are not specifically limited, but are exemplified by the above-cited carboxylate, oxalate, sulfate, phosphate, borate and silicate. Of these, Si compounds are preferable, and alkoxysilane is particularly preferable in view of the formation of the precursor sol having a uniform chemical composition.

Usable alkoxysilane is not specifically limited, but is exemplified by tri- or tetra-alkoxysilane each bearing an alkoxy group having 1 to 4 carbon atoms such as trimethoxysilane, triethoxysilane, tetramethoxysilane, tetraethoxysilane, tetrapropoxysilane and tetrabutoxysilane and/or oligomers thereof. Of these are preferable tetraethoxysilane, tetramethoxysilane and/or oligomers thereof.

Compounds containing at least one metallic element selected from the group consisting of Mn, Eu, Cu and Yb (e) are not specifically limited, but are exemplified by various ones corresponding to the type of the metallic element such as the above-cited carboxylate, oxalate, sulfate, phosphate, borate and silicate.

Examples of carboxylates include those bearing an alkyl group having 1 to 20 carbon atoms such as formate, acetate, caprate, laurate, myristate, palmitate and stearate. Of these, manganese carboxylate is preferable and manganese acetate is particularly preferable.

In the preparation of the precursor sol by mixing the above-mentioned components (a) to (c) and (e) in a mixed solvent composed of water and a polar organic solvent, and reacting the mixture under the conditions of hydrolysis/polycondensation, the polar organic solvent usable therein is not specifically limited provided that it is compatible with water. The use of the polar organic solvent compatible with water causes reaction in a homogeneous system of water and the polar organic solvent until the precursor sol is prepared. In the stage of maturing the same, the solvent is brought to a supercritical state to subject water and solvent to phase separation, thus enabling the precursor sol to be matured in the droplet of the water thus formed. Specifically protic and aprotic polar organic solvents are usable therein.

Examples of the protic polar organic solvent include alcohols, polyether bearing at least one unsubstituted hydroxyl group, hydroxyalkyl ester, hydroxyalkyl ketone and carboxylic acid. Examples of alcohols include mono- or di-hydroxy alcohol having 1 to 8 carbon atoms such as methanol, ethanol, propanol, butanol, pentanol and hexanol.

Examples of the aprotic polar organic solvent include a ketone, ether and ester that are specifically exemplified by acetone, tetrahydrofuran, methyl ethyl ketone and dimethylsulfoxide. Of these, alcohol is preferable, and ethanol is particularly preferable from the viewpoint of the affinity for water and precursor sol.

In the next place, the objective phosphor can be produced by maturing or reacting the resultant precursor sol in the presence of (f) an organic compound bearing at least one functional group at a terminal or side chain (modifying agent the components of which are as previously described), a polar organic solvent in a supercritical state and water.

The amount of the modifying agent to be added varies depending upon the adsorption configuration, and is not equivocally determined, but it is necessary to add the agent in an amount sufficient to cover the surface of the phosphor particles. When the amount of the organic compound to be added is too small to eliminate an exposed portion where particles are not covered, the luminescent energy in the portion is consumed by vibration energy, unfavorably giving rise to an energy loss, whereas an excessively large amount thereof decreases the filling density of the phosphor, unfavorably lowering the luminescence efficiency thereby.

In the following, $[Zn_2SiO_4:Mn^{2+}]$ is taken up as a typical example of the phosphor according to the present invention to describe one example of further specific production process, which however, shall never limit the present invention thereto.

Zinc acetate and manganese acetate are dissolved in ultrapure water so that a desirable Mn/Zn molar ratio is obtained. The molar ratio of manganese acetate to zinc acetate (Mn/Zn ratio) when supplied as starting materials is in the range of usually 0.002 to 0.20, preferably 0.01 to 0.10. The resultant solution is charged with a mixed solution containing a modifying agent such as PEG, an alkoxysilane such as tetraethoxysilane and an alcohol such as ethanol, and the resultant mixture is stirred at around room temperature, whereby hydrolysis reaction and polycondensation reaction are allowed to take place to prepare the precursor sol imparted with fluidity.

In a pressure vessel is placed an alcohol-contained in the vessel, in which is introduced the precursor sol thus obtained, the resultant mixture is heated to at least the critical temperature of the alcohol and pressurized to at least the critical pressure thereof to bring the alcohol to a supercritical state and solvothermal reaction state, and the mixture is kept in the states for a prescribed time to mature or react the precursor sol. Thereafter by removing the solvent and drying the sol, surface-modified [$Zn_2 SiO_4$:$Mn^{2+}$] nanoparticles can be produced.

The solvothermal reaction state as mentioned above, which is meant a reaction state utilizing a pressurized heated fluid as a field of reaction, can be controlled the physical chemical properties of the alcohol in a wide range by pressure/temperature and thus, is applied to the production of the phosphor according to the present invention.

The precursor is an intermediate substance in the course in which the alkoxide as a starting reaction material is hydrolyzed into a prescribed metal oxide, and means a composite prior to the stage of forming final crystalline structure. The precursor sol forms a state close to the state in which each of the components is uniformly mixed in the liquid.

Continuation of the above-mentioned reaction progressively turns the sol into a gel, and on gelling the precursor brings about phase separation into ZnO and $SiO_2$. Any supercritical treatment after the phase separation of the precursor into ZnO and $SiO_2$ results in failure to produce the objective phosphor according to the present invention. Specifically according to the present invention, importance is attached to the implementation of supercritical treatment at the time of a sol state by bringing the modifying agent into contact therewith prior to the precursor turning into a gel.

Moreover in order to further enhance the luminescence efficiency of the phosphor, it is important not only to decrease the size of particles but also to chemically modify the surface thereof.

Usually $Zn_2SiO_4$ doesn't crystallize at a temperature lower than 800° C., but under the condition of solvothermal reaction according to the present invention, $Zn_2SiO_4$ crystallizes by the effect of pressure at a relatively low temperature (a temperature somewhat higher than the critical temperature of the alcohol) and at a temperature at which the modifying agent such as PEG doesn't decompose, thereby enabling simultaneous crystallization with modification. In a system of a supercritical state alcohol/water, the alcohol and water are separated from each other to enable the surface-modified ultrafine particles to be obtained.

In the following, detailed description will be given of the mechanism in the case of producing $Zn_2SiO_4$ particles by giving an example of using PEG as a modifying agent.

When the precursor sol is heated in a pressure vessel, ethoxy groups of tetraethoxysilane [$Si(OC_2H_5)_4$] are firstly replaced with hydroxyl groups (OH), whereby part of the four ($OC_2H_5$) bonded to Si is hydrolyzed in turn to form a hydroxide $Si(OH)_x(OC_2H_5)_{4-x}$. The resultant hydroxide exerts mutual action along with $Zn^{2+}$ and $Mn^{2+}$ in the solution, and part of the sol forms nuclei as [$Zn_2SiO_4$:$Mn^{2+}$] by the hydrothermal synthesis mechanism.

When the reaction system exceeds the critical point of ethanol (critical temperature of 243.0° C. and critical pressure of 6.14 MPa or higher), for instance, as high as 260° C. and 9 MPa, approximately, the ethanol in the system turns to have hydrophobicity. Thereby the remaining chemical species of the precursor sol which has been imparted with affinity for the ethanol are brought to a state of supersaturation, and instantaneously precipitate together with nuclei formation, when highly crystalline particles having a small activated volume are precipitated because of high pressure.

The resultant particles, the surface of which is hydrophilic, migrate to water droplets in the system, and the particles in the water droplets grow by causing anisotropic growth due to Ostwald growth (a phenomenon in that by the surface energy of the particles functioning as driving force, smaller particles diminish and disappear, whereas larger particles grow). It is thought that the particles continue to grow in the above-mentioned manner in the presence of water and the polar organic solvent (ethanol) under a supercritical state.

In the production process according to the present invention, the volumetric ratio of water/the polar organic solvent (ethanol or the like) is in the range of usually 0.01 to 10, preferably 0.1 to 5, more preferably 0.3 to 3, most preferably 0.5 to 2.0. Water and ethanol, which are each a polar solvent, are usually miscible with each other. However when the ethanol alone is brought to a supercritical state, phase separation takes place, and thus water in the precursor sol disperses as spherical droplets so that the surface energy is minimized in the hydrophobic supercritical ethanol. Since nanoparticles grow in the droplets, importance should be attached to the volumetric ratio of water/the polar organic solvent (ethanol or the like).

When the volumetric ratio of water/ethanol is within the foregoing range, dispersed water droplets are stably present, and the particles therein are repeatedly dissolved and precipitated, whereby favorable anisotropic growth is accelerated. On the contrary, when the water content is unreasonably high, hydrolysis of tetraethoxysilane or the like preferentially takes place, and much nuclei formation comes out prior to ethanol reaching the supercritical state, whereby particle growth by polycondensation becomes less prone to occur. In contrast, when the water content is unreasonably low, polycondensation preferentially takes place, and tetraethoxysilane or the like is not completely hydrolyzed, whereby the nuclei formation rate is lowered and ZnO is unfavorably formed.

Moreover in order to form rod-shaped primary particles of phosphor, it is preferable to set the water/ethanol ratio on at most 1/1, and maturation temperature on the critical temperature or higher. On the other hand, when the water/ethanol ratio is set on at least 1/1, and maturation temperature is set on the critical temperature or lower, spherical primary particles thereof are likely to be formed.

The [$Zn_2SiO_4$:$Mn^{2+}$] phosphor exhibits green luminescence through excitation of the matrix, charge transfer from $O^{2-}$ to $Mn^{2+}$ causing energy transfer to $Mn^{2+}$ and d-d transition. The luminescent intensity is enhanced by the above-mentioned anisotropic growth. This arises from that the surface defect of particles which becomes a luminescence killer is decreased, and thereby the energy loss due to the defect on energy transfer is decreased. Accordingly the luminescent intensity increases with an increase in the anisotropic growth of primary particles in the shape of rod.

The concentration of sol in the system (volumetric ratio of sol/alcohol), for instance, volumetric ratio of sol/ethanol is in the range of preferably 0.1 to 10.0, more preferably 0.5 to 2.0. When the concentration thereof falls under the foregoing range, a large number of nuclei are formed, facilitating the formation of particles having a suitable size owing to aggregation of the nuclei in water droplets, a larger number of primary particles cause anisotropic growth, while being united, and the surface defect of particles is lessened, thereby enhancing the luminescent intensity. In contrast, when the concentration thereof is unreasonably low, the amount of formed nuclei is decreased, supersaturation doesn't sufficiently occur when the critical point is attained, and therefore the growth of the nuclei into particles is rendered insufficient. On the contrary, unreasonably high concentration thereof unfavorably gives rise to excessive aggregation of particles.

The addition of the modifying agent causes primary particles of [$Zn_2SiO_4:Mn^{2+}$] with single nanoorder to be formed, and simultaneously brings about surface modification thereof, thereby enabling further efficient production of nano-phosphor having high luminescent intensity. It is thought that hydroxyl groups of the modifying agent forms a complex together with the metallic ions in the solution, forming particles which are surface-modified with the agent, whereby the aggregation of the particles themselves is suppressed, and further, that surface defect of the [$Zn_2SiO_4:Mn^{2+}$] is capped with surface modification of the phosphor, enables efficient energy transfer towards $Mn^{2+}$, and increases luminescence efficiency two times or more.

In the production process according to the present invention, the precursor sol which has been obtained in the hydrolysis/polycondensation reaction is matured or reacted in the presence of the modifying agent, a polar organic solvent in a supercritical state and water. The temperature in this case, which may be optionally selected provided that it is not lower than the temperature of the hydrolysis/polycondensation reaction, is usually the critical temperature of the polar organic solvent or higher, preferably 243° C. or higher, more preferably in the range of 243 to 300° C.

The rate of dissolution deposition increases with a rise in the temperature of maturation or reaction, accompanied by an increase in the rate of anisotropic growth. In the case where the polar organic solvent (alcohol or the like) is in a supercritical state, highly crystalline nuclei are formed from the beginning, and a high rate of crystal growth due to the dissolution deposition enhances luminescent intensity. On the other hand, under the conditions of hydrothermal synthesis at the critical point or lower, highly defective nuclei formation takes place, and the rate of crystal growth due to the dissolution deposition is lowered thereby in comparison with the maturation in a supercritical state, hence lowering luminescent intensity.

The maturation time, which is preferably as long as possible, is in the range of usually 0.5 to 50 hours, preferably 1 to 10 hours from the viewpoint of the productivity. A longer maturation time promotes the anisotropic growth of primary particles due to the dissolution deposition, leading to enhancement of particle crystallinity and besides luminescence intensity. This is considered to be due to the phenomenon that longer maturation time causes the dissolution-precipitation reaction to a greater extent corresponding thereto, promotes anisotropic growth, lessens the surface defect, and thereby the energy trapped by the defect is diminished.

By drying the phosphor particles after maturation, it is possible to remove alcohol and water and to activate the center of fluorescence. The drying temperature, which is not specifically limited provided that it is not higher than the temperature of the hydrolysis/polycondensation reaction, is preferably 100 to 270° C.

In addition, it is possible to efficiently produce through the second production process, a phosphor which is represented by the general formula according to the present invention [$Zn_a(M)_b(N)_cO_d:Y$] in which M is at least one metallic element selected from the group consisting of B, Al and Ga; N is Si or Ge; O is oxygen; Y' is at least one activating agent selected from the group consisting of $Mn^{2+}$, $Eu^{2+}$, $Cu^{2+}$, $Yb^{2+}$; and a, b, c and d are each a value satisfying the relationships $0<a\leq2$, $0\leq b\leq2$, $0\leq c\leq2$ and $0<d\leq4$, and which is not surface-modified.

Specifically, by reacting (a) a carboxylate of zinc, (b) a compound containing at least one metallic element selected from the group consisting of B, Al and Ga, (c) a compound containing at least one metallic element selected from the group consisting of Si and Ge, and (e) a compound containing at least one metallic element selected from the group consisting of Mn, Eu, Cu and Yb under the conditions of hydrolysis/polycondensation reaction to prepare a precursor sol and subsequently maturing or reacting the resultant precursor sol in the presence of a polar organic solvent in a supercritical state and water.

With regard to the second production process according to the present invention, the phosphor can be produced mutatis mutandis in accordance with the first production process except for the non-use of the modifying agent.

According to the second production process of the present invention, it is made possible to produce a phosphor excellent in luminescent intensity by maturing or reacting a precursor sol which is obtained from a carboxylate of zinc and the like as starting materials in the presence of a polar organic solvent in a supercritical state and water without causing any of carbonization of the polar organic solvent due to an oxidizing agent, contamination and lowered luminescent intensity. Further according to the second production process of the present invention, the luminescent intensity is enhanced by about four times as compared with the case where nitric acid or a nitrate is used as a starting material.

According to any of the production processes of the present invention, the average particle diameter of the primary particles of the phosphor to be obtained is in the range of 0.5 to 50 nm, preferably 0.8 to 10 nm. Since the primary particles are likely to aggregate, a phosphor according to a conventional production process has an average aggregated particle diameter of about 400 to 1000 nm owing to the primary particles being greatly firmly aggregated, resulting in lowered luminescence efficiency. As opposed to the foregoing, the phosphor according to the present invention, although the primary particles is somewhat aggregated, has high luminescent intensity due to slight extent of aggregation.

Further in the case where the primary particles are covered with a modifying agent such as PEG, the aggregated particles are made into the form of multi-core, and are extremely excellent in luminescence efficiency in spite of average aggregated particle diameter being 50 to 800 nm, particularly 50 to 400 nm.

The phosphor obtained according to the present invention can be subjected as necessary, to a grinding disintegration treatment by means of, for instance, a ball mill, jet mill or the like, a cleaning/classification treatment, a ultraviolet irradiation treatment, an incineration treatment or the like.

EXAMPLE

In what follows, the present invention will be described more specifically with reference to working examples, which however shall never limit the present invention thereto.

Observation with a transmission electron microscope (TEM), measurement of particle size distribution, measurement by X-ray diffraction (XRD) and measurement by luminescence spectrum (PL) were carried out in the following manner.

(1) Observation With a Transmission Electron Microscope (TEM)

Measurements were made at an acceleration voltage of 200 kV by the use of a transmission electron microscope (TEM, available from International Test & Engineering Services Co, Ltd. under the trade name tecnai F20 Philipes). As a specimen stand for TEM, there was used a microgrid (widespread product, available from Okenshoji Co., Ltd.). A specimen as such was dispersed in ethanol, and caught in the microgrid.

(2) Measurement of Particle Size Distribution by Laser Diffraction System Light Scattering Measurements were made of average particle diameters for primary particles of phosphor and for aggregated particles, respectively by the use of a measuring apparatus for particle size distribution by laser diffraction system light scattering (available from Beckmann/Kohltar Co., Ltd. under the trade name LS230)

(3) Measurement by X-Ray Diffraction (XRD)

Measurements were made to confirm crystalline structure of specimens by the use of a measuring apparatus by X-ray diffraction (available from Rigaku Denki Kogyo Co., Ltd. under the trade name Rint-2200: target of Cu—Kα, 30 kV, 40 mA, 2 deg/min)

(4) Measurement by Fluorescence Spectrum (PL)

Luminescent intensity was measured by the use of a measuring apparatus by luminescence spectrum (available from Japan Bunko Co., Ltd. under the trade name JASCO FP-6500, 100/min: filter; Toshiba Glass Co., Ltd. UV-29), while 0.1 g of each of specimens was placed in a powdery specimen measuring sample of 1.5 cm in diameter, and was excited with an Xe lamp.

Example 1

Zinc acetate tetrahydrate in an amount of 4.302 g ($1.96 \times 10^{-2}$ mol) and 0.098 g ($4.00 \times 10^{-4}$ mol) of manganese acetate dihydrate were dissolved in 15 cm$^3$ of ultrapure water so that Mn/Zn molar ratio was set on 2/98. The resultant solution was charged with a mixed solution consisting of 4.0 g of polyethylene glycol (PEG) having a weight average molecular weight of 4,000, 2.083 g ($1.00 \times 10^{-2}$ mol) of tetraethoxysilane, and 15 cm$^3$ of ethanol (water/ethanol ratio by volume of 1/1) under stirring for 10 minutes to prepare a precursor sol.

Subsequently a glass-made vessel containing 30 cm$^3$ of ethanol was placed in an autoclave, and 15 cm$^3$ of the precursor sol was introduced in the vessel. The temperature in the autoclave was raised to 265° C. at a rate of 4 K/min with the pressure raised to 9.5 MPa, and the ethanol was brought to a supercritical state, which was maintained for 2 hours. Thereafter the solvent was removed and the product was dried at 265° C. for 2 hours to obtain a phosphor (PEGST). An X ray diffraction profile proved that the PEGST was an α-single phase phosphor of $Zn_2SiO_4$. The primary particles were spherical and had an average particle diameter of 4 nm, while the aggregated particles were in the form of multi-core and had an average particle diameter of 272 nm.

FIG. 1 illustrates a micrograph of particle state observation for the resultant phosphor (PEGST) by means of a transmission electron microscope. FIG. 2 illustrates a fluorescence spectrum of the PEGST.

Example 2

The procedure in Example 1 was repeated to obtain a phosphor except that 2.0 g of PEG having a Mw of 400 was used. The phosphor thus obtained had luminescent intensity almost comparable to that of the PEGST as obtained in Example 1.

Example 3

Zinc acetate tetrahydrate in an amount of 4.302 g ($1.96 \times 10^{-2}$ mol) and 0.098 g ($4.00 \times 10^{-4}$ mol) of manganese acetate dihydrate were dissolved in 15 cm$^3$ of ultrapure water so that Mn/Zn molar ratio was set on 2/98. The resultant solution was charged with a mixed solution consisting of 2.083 g ($1.00 \times 10^{-2}$ mol) of tetraethoxysilane, and 15 cm$^3$ of ethanol (water/ethanol ratio by volume of 1/1) under stirring for 10 minutes to prepare a precursor sol.

Subsequently a glass-made inner cylinder was placed in an autoclave, 30 cm$^3$ of ethanol was added in the cylinder, and a vial containing 15 cm$^3$ of the precursor sol was set so as not to come into direct contact with the ethanol. The temperature in the autoclave was raised to 265° C. at a rate of 4 K/min with the pressure raised to 9.5 MPa, and the ethanol was brought to a supercritical state, which was maintained for 2 hours. Thereafter the solvent was removed and the product was dried at 265° C. for 2 hours to obtain a phosphor (ST). The primary particles of the phosphor were columnar (rod shaped) and had an average particle diameter (column diameter) of 10 nm, while the aggregated particles had an average particle diameter of 272 nm.

FIGS. 2, 4 and 7 illustrate a fluorescence spectrum of the resultant phosphor (ST). FIG. 3 illustrates a micrograph of particle state observation for the ST by means of a transmission electron microscope.

Example 4

The procedure in Example 3 was repeated to obtain a phosphor (MIX15) except that 15 cm$^3$ of the precursor sol and 30 cm$^3$ of ethanol were mixed in the autoclave without separating from each other.

FIG. 2 illustrates a fluorescence spectrum of the resultant phosphor (MIX15).

Example 5

The procedure in Example 3 was repeated to prepare a precursor sol except that 10 cm$^3$ of ultrapure water and 20 cm$^3$ of ethanol were used (water/ethanol ratio by volume being 1/2). Thereafter the procedure by using the autoclave in Example 2 was repeated to obtain a phosphor (W10) except that 35 cm$^3$ of ethanol and 10 cm$^3$ of the precursor sol were used. The primary particles of the phosphor were columnar (rod-shaped) and had an average particle diameter (column diameter) of 3 nm, while the aggregated particles had an average particle diameter of 161 nm.

FIG. 4 illustrates a fluorescence spectrum of the resultant phosphor (W10). FIG. 5 illustrates a micrograph of particle state observation for the W10 by means of a transmission electron microscope.

Example 6

The procedure in Example 3 was repeated to prepare a precursor sol except that 20 cm³ of ultrapure water and 10 cm³ of ethanol were used (water/ethanol ratio by volume being 2/1). Thereafter the procedure by using the autoclave in Example 2 was repeated to obtain a phosphor (W 20) except that 25 cm³ of ethanol and 20 cm³ of the precursor sol were used. The primary particles of the phosphor were columnar (rod-shaped) and had an average particle diameter (column diameter) of 9 nm, while the aggregated particles had an average particle diameter of 203 nm.

FIG. 4 illustrates a fluorescence spectrum of the resultant phosphor (W20). FIG. 6 illustrates a micrograph of particle state observation for the W20 by means of a transmission electron microscope.

Comparative Example 1

Zinc acetate tetrahydrate in an amount of 9.455 g ($4.307 \times 10^{-2}$ mol) and 0.2153 g ($8.785 \times 10^{-4}$ mol) of manganese acetate dihydrate were dissolved in 7 cm³ of nitric acid and 13 cm³ of ultrapure water so that Mn/Zn molar ratio was set on 2/98. The resultant solution was charged with a mixed solution consisting of 4.578 g ($2.197 \times 10^{-2}$ mol) of tetraethoxysilane and 25 cm³ of ethanol under stirring for 10 minutes to prepare a precursor sol.

Subsequently a glass-made inner cylinder was placed in an autoclave, 30 cm³ of ethanol was added in the cylinder, and a vial containing 15 cm³ of the precursor sol was set so as not to come into direct contact with the ethanol. The temperature in the autoclave was raised to 265° C. at a rate of 5 K/min with the pressure raised to 8.2 MPa, and the ethanol was brought to a supercritical state, which was maintained for 2 hours. Thereafter the solvent was removed and the product was dried at 265° C. for 2 hours to obtain a phosphor (S—SC). An X-ray diffraction profile proved that the S—SC was an α-phosphor of $Zn_2SiO_4$. The aggregated particles had an average particle diameter of 0.4 μm.

FIG. 7 illustrates fluorescence spectrum of the resultant phosphor (S—SC) and the ST.

INDUSTRIAL APPLICABILITY

The phosphor according to the present invention, which is excellent in transparency and light transmittance and has extremely high luminescence efficiency, can be effectively utilized in the fields of an image display unit such as PDP, information security, medical machinery and equipment, building, interior and the like. In addition, the production process for phosphor according to the present invention, which facilitates the control of the phosphor configuration, can advantageously produce phosphors having excellent luminescence efficiency.

The invention claimed is:

1. A phosphor comprising phosphor particles that are covered with an organic compound bearing one or more functional groups at a terminal or side chain, wherein said one or more functional groups are functional groups other than a thiol, mercapto, mercaptan or sulfhydryl functional group, said particles being represented by the general formula $$[(L)_a(M)_b(N)_cO_d:Y]$$

wherein L is at least one metallic element selected from the group consisting of Zn, Mg, Ca, Sr and Ba; M is at least one metallic element selected from the group consisting of B, Al and Ga; N is Si or Ge; O is oxygen; Y is at least one activating agent selected from the group consisting of $Mn^{2+}$, $Eu^{2+}$, $Cu^{2+}$, $Yb^{2+}$, $Cr^{3+}$, $Ce^{3+}$, $Pr^{3+}$, $Nd^{3+}$, $Sm^{3+}$, $Eu^{3+}$, $Tb^{3+}$, $Dy^{3+}$, $Er^{3+}$, $Tm^{3+}$ and $Mn^{4+}$; and a, b, c and d are each a value satisfying the relationships $0 < a \leq 2$, $0b \leq 2$, $0 \leq c \leq 2$ and $2a+3b+4c=2d$.

2. The phosphor according to claim 1, wherein said particles are represented by the general formula $$[Zn_a(M)_b(N)_cO_d:Y']$$

wherein M, N and O are as previously defined; Y' is at least one activating agent selected from the group consisting of $Mn^{2+}$, $Eu^{2+}$, $Cu^{2+}$, and $Yb^{2+}$; and a, b, c and d are each a value satisfying the relationships $0 < a \leq 2$, $0 \leq b \leq 2$, $0 \leq c \leq 2$ and $0 \leq d\ 4$.

3. The phosphor according to claim 1, wherein said particles are represented by the general formula $$[Zn_2 SiO_4:Mn^{2+}].$$

4. The phosphor according to claim 1, wherein the primary particles of the phosphor have an average particle diameter in the range of 0.5 to 50 nm.

5. A process for producing a phosphor comprising phosphor particles that are covered with an organic compound bearing at least one functional group at a terminal or side chain, said particles being represented by the general formula $$[Zn_a(M)_b(N)_cO_d:Y']$$

wherein M is at least one metallic element selected from the group consisting of B, Al and Ga; N is Si or Ge; O is oxygen; Y' is at least one activating agent selected from the group consisting of $Mn^{2+}$, $Eu^{2+}$, $Cu^{2+}$, and $Yb^{2+}$, and a, b, c and d are each a value satisfying the relationships $0 < a \leq 2$, $0 \leq b \leq 2$, $0 \leq c \leq 2$ and $0 \leq d\ 4$, wherein said process comprises reacting as starting compounds, (a) a carboxylate of zinc, (b) a compound containing at least one metallic element selected from the group consisting of B, Al and Ga, (c) a compound containing at least one metallic element selected from the group consisting of Si and Ge, and (e) a compound containing at least one metallic element selected from the group consisting of Mn, Eu, Cu and Yb under the conditions of hydrolysis/polycondensation in a mixed solvent composed of water and an organic polar solvent to prepare a precursor sol and subsequently maturing or reacting the resultant precursor sol in the presence of (f) an organic compound bearing at least one functional group at a terminal or side chain, a polar organic solvent in a supercritical state and water.

6. The process for producing the phosphor according to claim 5, wherein the starting compounds are zinc acetate, a silicon compound and a compound containing manganese.

7. The process for producing the phosphor according to claim 6, wherein the silicon compound is an alkoxysilane.

8. The process for producing the phosphor according to claim 5, wherein the volumetric ratio of water/the polar organic solvent is in the range of 0.01 to 10.

9. The process for producing the phosphor according to claim 5, wherein the polar organic solvent is ethanol.

10. The process for producing the phosphor according to claim 5, wherein the compound containing at least one metallic element selected from the group consisting of Mn, Eu, Cu and Yb is an acetate.

11. The phosphor according to claim 1, wherein the organic compound bears only one or more functional groups selected from the group consisting of OH, COOH, $SO_3H$, $HPO_4$, $H_2PO_4$, NH, $NH_2$, and NHR, wherein R is an alkyl group having from 1 to 4 carbon atoms, at a terminal or side chain.

12. The phosphor according to claim 1, wherein the organic compound bearing one or more functional groups at a terminal or side chain is selected from the group consisting of polyethylene glycol, ethylene glycol, 1,3-propanediol, 1,4-butanediol, 1,5-pentanediol, 1,6-hexanediol, glycerol, isobutyl alcohol, 1,4-hydroxybenzene, 1,3-hydroxybenzene, 1,2-hydroxybenzene, and 2-hydroxyethylamine.

13. The phosphor according to claim 12, wherein the organic compound bearing one or more functional groups at a terminal or side chain is polyethylene glycol.

* * * * *